March 11, 1952   E. A. BURRILL ET AL   2,588,613
SYSTEM OR APPARATUS FOR STABILIZING THE
VOLTAGE OF ELECTROSTATIC GENERATORS
Filed Oct. 18, 1949   5 Sheets-Sheet 5
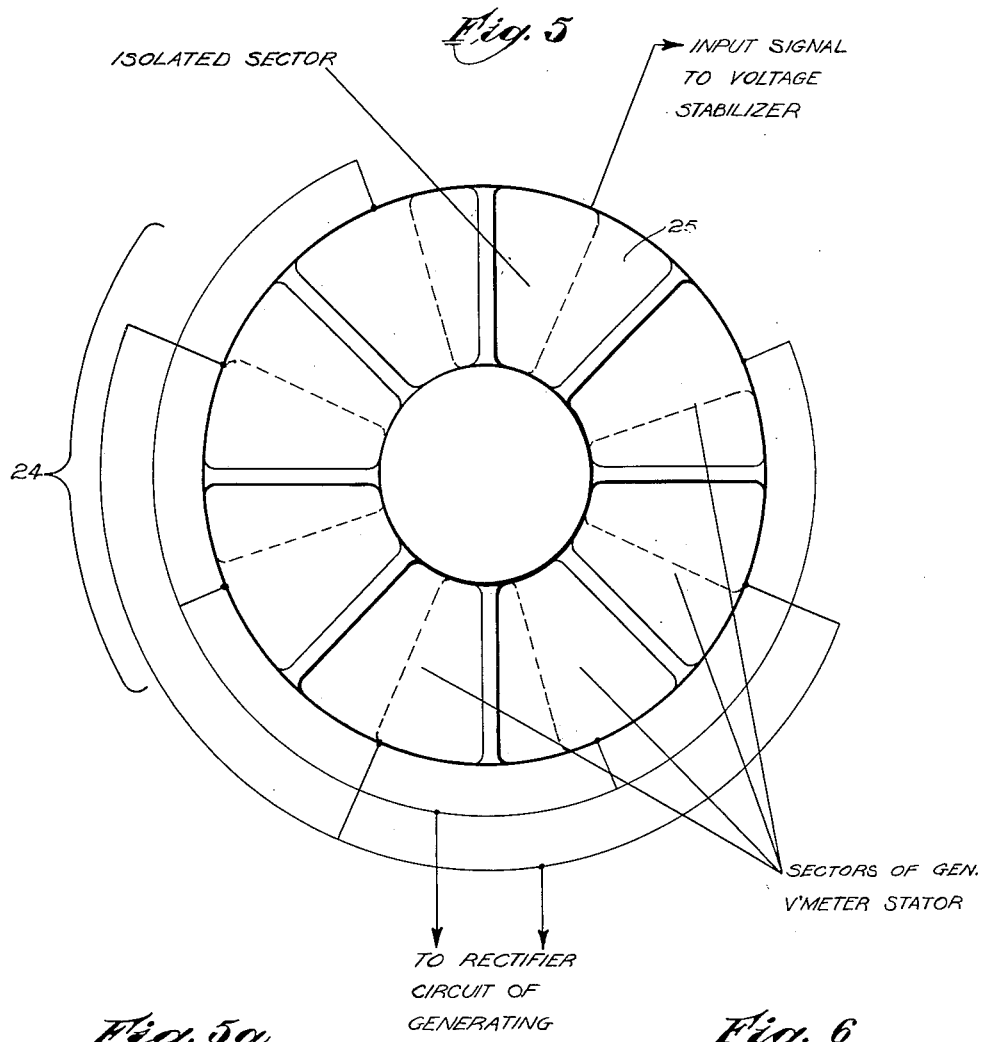
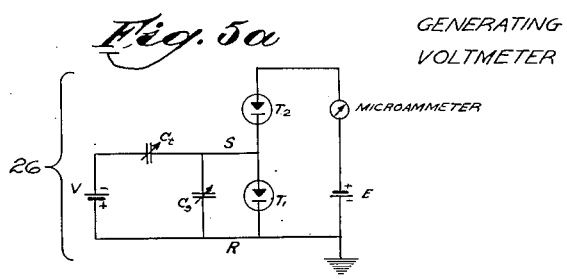
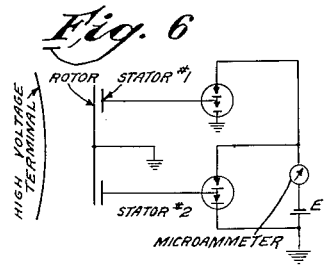
Inventors
Ernest A. Burrill
William V. Smith Patented Mar. 11, 1952

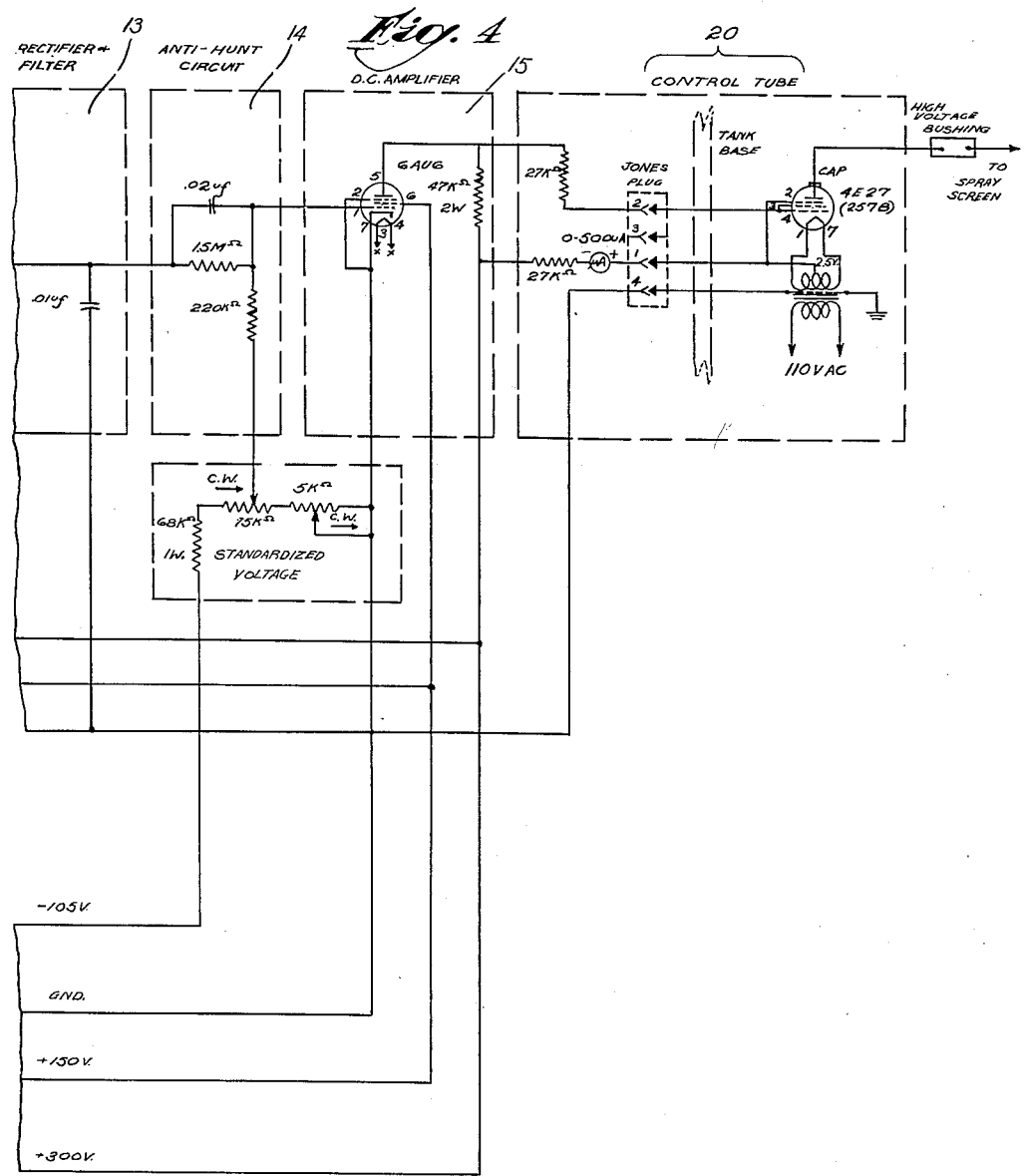

2,588,613

UNITED STATES PATENT OFFICE 2,588,613

SYSTEM OR APPARATUS FOR STABILIZING THE VOLTAGE OF ELECTROSTATIC GENERATORS

Ernest A. Burrill, Natick, and William V. Smith, Auburndale, Mass., assignors to High Voltage Engineering Corporation, Cambridge, Mass., a corporation of Massachusetts Application October 18, 1949, Serial No. 122,038

15 Claims. (Cl. 322—2)

1

This invention relates to systems or apparatus for stabilizing the voltage of electrostatic belt-type generators.

In order that the principle of the invention may be readily understood, we have disclosed in the accompanying drawings one embodiment of means whereby our invention may be practiced, and wherein is provided an electronic circuit constituting an essential portion of the said system or apparatus, which circuit obtains a signal from the voltage-measuring equipment of an electrostatic belt-type generator, and, by means of the fluctuations of such signal as compared with a standardized signal (hereinafter specifically referred to), regulates the amount of electric current conveyed to the high voltage terminal of such generator by means of the insulating, traveling, charging belt thereof, thereby causing the terminal voltage of the generator to be stabilized; said electronic circuit also enables the generator voltage to be adjusted to any value within the design range of the said generator and to remain stable at that value; and, finally, said electronic circuit enables the generator voltage to be held stabilized independently of the amount of current that is required to maintain that voltage within the design range of the generator.

In the said drawings:

Fig. 4 is a similar representation of the other part (herein the right hand part) of the said stabilizer circuit;

Fig. 5 is a diagram showing the electrical connections to the stator plates of the generating voltmeter;

Fig. 5a represents the circuit for the generating voltmeter; and

Fig. 6 represents the circuit for the generating voltmeter having two stators displaced 180 electrical degrees and provided with independent rectifier systems.

Figure 1:
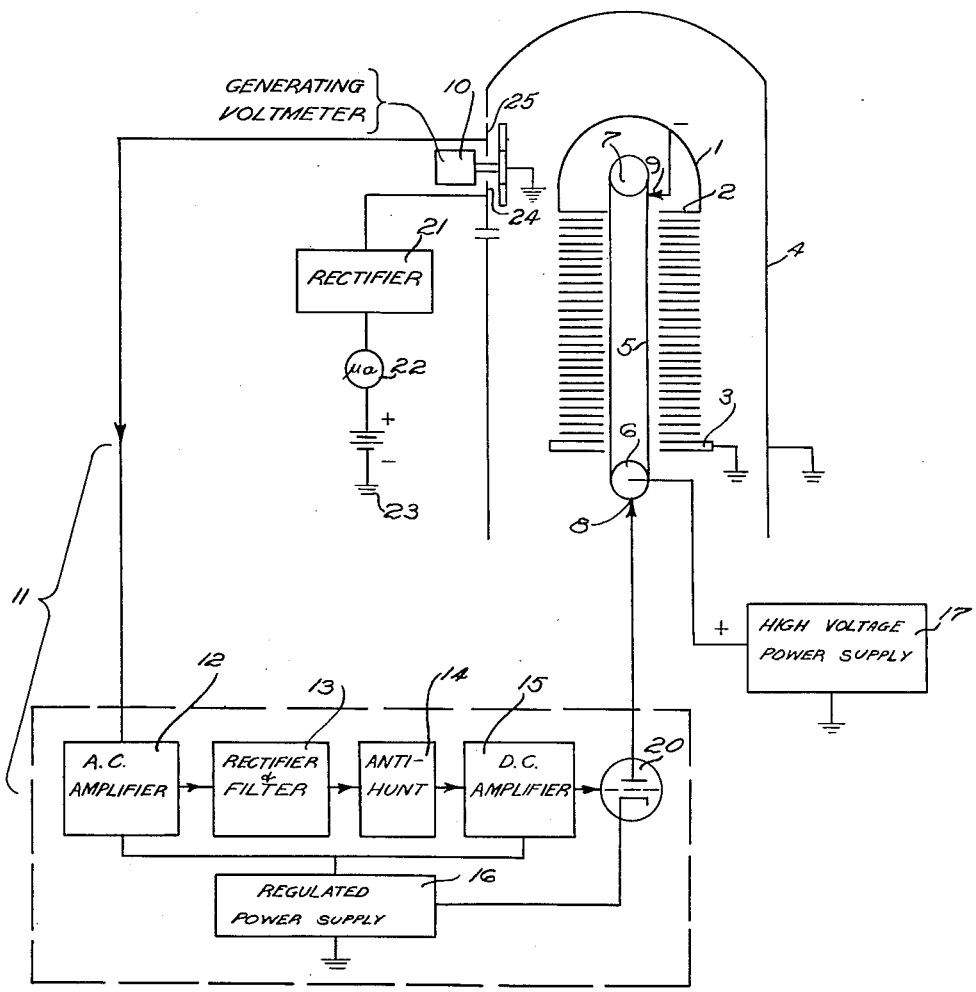
Fig. 1 is a diagram representing schematically the relation of the various components of the system or apparatus of our invention, with the electrostatic belt type generator therein diagrammatically indicated operating negatively.
Figure 2:
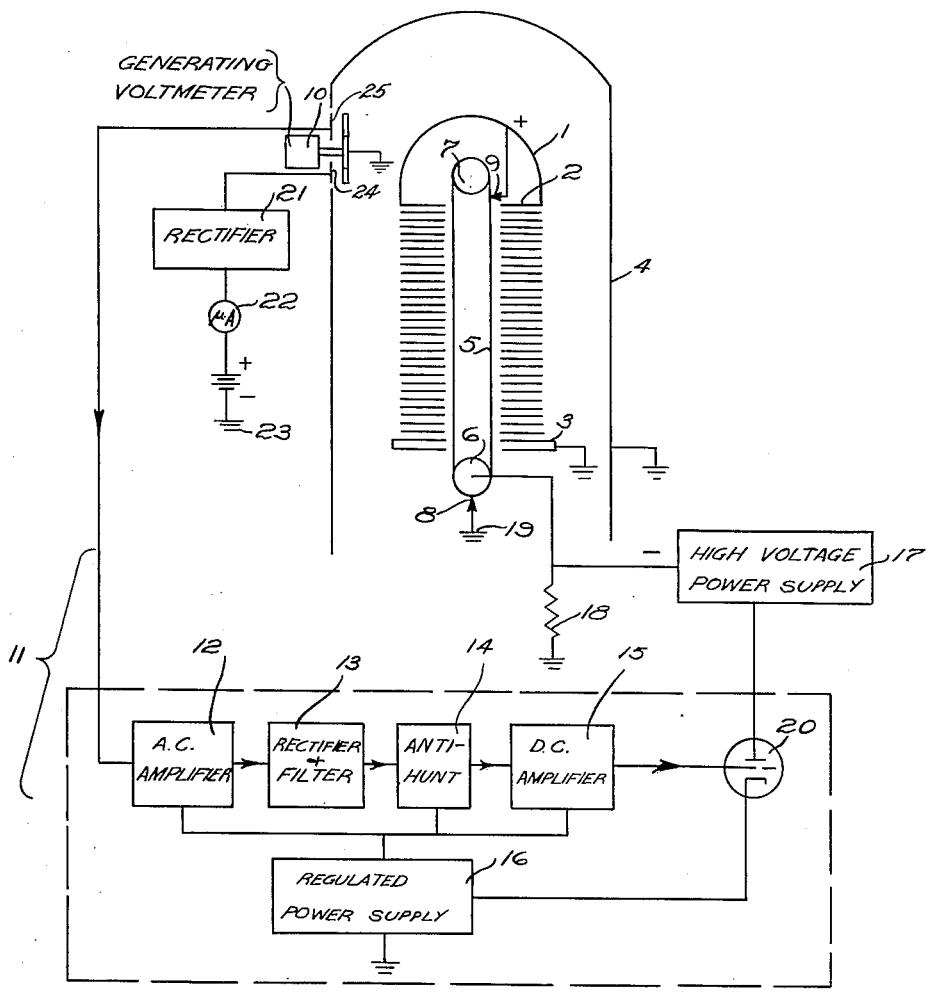
Fig. 2 is a diagram similar to Fig. 1, but with the said electrostatic generator operating positively.

Referring more particularly to the drawings, and first to Figs. 1 and 2 thereof, therein are shown diagrammatically such parts of an electrostatic generator as are necessary to an understanding of this invention. The said generator is of the type shown in the patent to John G. Trump, No. 2,252,668, August 12, 1941. The invention herein claimed may be applied to the said type of electrostatic apparatus, but our invention is not necessarily limited to use with such type of apparatus.

In Figs. 1 and 2 the electrostatic generator, merely diagrammatically shown, comprises the main high-potential electrode 1 consisting of a hollow shell of conducting material, such as brass, this being of a generally rounded and approximately hemispherical shape and free from external projections. The electrode rests on a ring 2 of conductive metal, the outer exposed surface of which is rounded, the said ring, in turn, being mounted on the top of any suitable number, such as three, of spaced elongated pillars or columns, not shown, which may be similar to those in the said patent to Trump, said pillars or columns being of insulating material of high dielectric strength.

The bases of these columns rest on the base plate 3 of conductive material which is supported by suitable brackets attached to the inner walls of a tank 4 which provides a chamber completely enclosing all the parts of the generating apparatus, but leaving a substantial clearance between its walls and the electrode and insulating columns. The said tank is desirably filled with a gas of many atmospheres pressure which, for air, may be about 400 pounds per square inch.

The charge-carrier may be of any suitable type, but is herein shown as in the form of an endless belt 5 of such construction that the charges on its surface are longitudinally insulated from each other, the belt 5 herein being of insulating material, such as a multiple-ply rubber fabric. At its lower end the belt 5 passes over a metallic driving pulley 6 journalled in suitable brackets on the base plate, so that when the generator is operating positively as in Fig. 2, the pulley has a grounded connection as indicated. The said pulley 6 is driven by a suitable motor not herein illustrated, to which current is supplied by conductors entering the walls of the tank 4 through a suitable bushing. Our invention requires that the metallic driving pulley 6 be well insulated from the ground to permit the pulley 6 to rise to potentials of several kilovolts. This condition arises whether the generator operates positively or negatively.

The belt 5 runs vertically upward and then downward in a parallel line, passing into and out of the hollow electrode 1 and over a metallic pulley 7 within the electrode shell, the said pulley 7 being journaled in or insulated from suitable brackets supported by the ring 2 in a manner not necessary to illustrate or to refer to further.

At the lower end of the belt 5 charges of one sign are established on the moving belt 5, and at its upper end the charges carried thereby are removed and transferred to the electrode 1. The charging of the down-running side of the belt 5 is optional with us and is not necessary to the function of our invention. If employed then, simultaneously charges of opposite sign are transferred through the electrode 1 to the belt 5 at its upper end and are carried away by the descending run to the lower end of the belt 5, where they are removed.

The charge spraying corona points are indicated diagrammatically at 8 and the charge removing corona points are indicated diagrammatically at 9. It is unnecessary herein to disclose in detail the said corona points 8 and 9 or the number thereof. It is sufficient here to state that there is at 8 and 9 a set of such points extending in a straight line across the width of the said charge carrier belt 5.

Figs. 1 and 2 are identical excepting that Fig. 1 represents the electrostatic generator as operating negatively, and Fig. 2 represents said generator as operating positively, the generating voltmeter being indicated diagrammatically at 10 in both of said figures. It is shown more in detail in Fig. 5 and will be hereinafter more specifically referred to in connection therewith.

We believe it to be essential to the successful practice of our invention to obtain a signal representing the generator voltage and for this purpose we have employed a generating voltmeter. In practice we have employed for the purpose a generating voltmeter for pressure-insulated high-voltage sources fully described in a paper by J. G. Trump, F. J. Safford and R. J. Van de Graaff, of the Massassachusetts Institute of Technology, Cambridge, Massachusetts, printed in The Review of Scientific Instruments, vol. 11, No. 2, pages 54, 56, February 1940, and elsewhere, to which we make reference for a full disclosure of the construction and principle of operation thereof. Our invention is not, for all purposes, limited to the employment of such generating voltmeter.

It is sufficient for the purpose of disclosing and explaining our invention and the practice thereof, to state that the electric field surrounding the high voltage terminal of the electrostatic generator induces an alternating current in such generating voltmeter diagrammatically indicated at 10 associated with such generator, which alternating current is proportional to the generator voltage.

In accordance with our invention, we isolate a sector, section or portion of the generating voltmeter 10, shown diagrammatically in Figs. 1 and 2 and in Fig. 5 shown more in detail, for the reason that it is highly desirable to observe the generator voltage by means of a meter while at the same time the generator is being stabilized. We have, in the course of our investigations, found that it is impractical to use the entire current from the generating voltmeter 10 to stabilize the generator voltage and effectively to observe the generator voltage simultaneously, because the generating voltmeter circuit is of low impedance. We have discovered, however, that by isolating a section, sector or portion of the generating voltmeter 10, we obtain an alternating voltage which is proportional to the generator voltage. The remainder of the generating voltmeter 10 can still be used as a voltage-measuring device with only a slight loss in sensitivity.

In accordance with the preferred manner of practicing our invention, we isolate one sector, section or portion of the generating voltmeter from the rest, and use the voltage from such isolated sector, section or portion as the signal to the stabilizer circuit 11, and since such signal is an alternating voltage of varying amplitude depending upon the generator voltage, it can be amplified to a magnitude that is sufficient for the characteristics of the stabilizer circuit 11. Such stabilizer circuit is indicated merely diagrammatically at 11 in each of said Figs. 1 and 2, and the parts of said stabilizer circuit are merely diagrammatically shown in Figs. 1 and 2, the parts of the circuit being shown in Figs. 3 and 4, and they will be subsequently described.

The principle of operation of the belt-type electrostatic generator is well known. Such a generator is shown, for example, in the patent to R. J. Van de Graaff, No. 2,230,473, February 4, 1941, and in the patent to John G. Trump, No. 2,252,668, August 12, 1941. The voltage gradient along the insulating column of such electrostatic generator is controlled by means of a potential-dividing resistor or set of corona points. The magnitude of the current through such resistor or corona points is dependent on the generator voltage. Such current is a direct current in nature and may be large enough in magnitude to obviate the necessity of amplification which, however, we desirably employ for best results. Both the resistor and the corona-point circuits are of high impedance in character. We have discovered in our experimentation that the introduction of the stabilizer circuit of our invention does not change their behavior, as in the case of the generating voltmeter circuit. We have also ascertained in the course of our investigations that for reliability of the stabilizer over long periods of time, however, the current from either the resistor or corona points is not as dependable as a signal as that which we obtain from the generating voltmeter.

If a corona point or points is or are placed in the vicinity of the high voltage terminal of the electrostatic belt-type generator and connected to ground, it is possible to cause a current to flow between the terminal and the corona point or points, the magnitude of which current depends upon the generator voltage, the gap between the corona point or points and the terminal, the insulating gas pressure surrounding the terminal, and the number of corona points involved. With all other variables held constant, however, the current is a function of the generator voltage. This current is a direct current in nature and may be of sufficient magnitude to be used without further amplification. As in the case of the resistor or column corona currents, however, this corona load current is not as dependable as is the generating voltmeter current for a signal to the stabilizer circuit 11.

Inasmuch as we have obtained the best results by using the voltage from an isolated section, sector or portion of the generating voltmeter 10 for obtaining a signal by which we regulate the amount of electric current conveyed to the high voltage terminal of the generator by way of its insulating traveling belt 5, we will herein, but without for all purposes limiting ourselves thereto, in describing the electronic circuit of the voltage stabilizer, refer to and describe the said signal as obtained from the generating voltmeter 10.

In doing so, as already stated, we isolate one sector, section or portion of the generating voltmeter 10 from the rest, and employ the voltage from such isolated sector, section or portion as the signal to the stabilizer circuit 11. Next, we amplify, by an alternating current amplifier 12, desirably, in two stages, the amplitude of the signal obtained from the said isolated sector, section or portion of the generating voltmeter 10 to a sufficient extent to permit rectification and filtering without appreciable losses. We incorporate in the alternating current amplifier 12 a control for regulating the amount of amplification. This control permits the rest of the stabilizer circuit 11 to operate in its most effective range. Since the remainder of the stabilizer circuit 11 utilizes direct current, we provide a suitable vacuum tube which permits the discharging of the condenser in the output stage of the amplifier 12 so as to dissipate the remainder of the alternating current signal.

Next, in accordance with our invention, the amplified alternating current signal from the generating voltmeter 11 is rectified and filtered by a resistor-condenser network 13. We have successfully employed half-wave rectification for the purpose, but additional smoothing and stability is securable by whole-wave rectification of the alternating current signal, and we desirably provide such rectification.

For the reasons already herein stated, we provide an anti-hunt circuit which may comprise or include a resistor-condenser network in circuit with said rectifier and filter 13, and we have merely diagrammatically indicated the same at 14 in both of said figures.

In order to compare the signal from the anti-hunt circuit 14, to a standardized voltage signal from a regulated power supply, and obtain what we term a "compensating voltage," we preferably next amplify the error voltage, as by a single-tube direct-current amplifier which we have merely diagrammatically indicated at 15 in said Figs. 1 and 2. This increases the magnitude of the error voltage sufficiently to control the grid of the tube which valves the charging current.

In the electronic sense of the word, the voltage stabilizer is slow in action. This is necessarily so because the change in voltage of the high voltage terminal of the generator alters the signal obtained from the generating voltmeter 10 almost immediately. There is essentially no time lag between the arrival of such signal at or in the stabilizer circuit 11 and the subsequent change in the magnitude of the charging current. The relatively slow speed of the charging belt 5 of the generator (though in practice it travels at the rate of one-half to one and a half miles a minute) introduces a time lag between the change in the charging current and the arrival of the altered current at the high voltage terminal. Because of ever-changing corona conditions in the high voltage region, the generator voltage may have reverted to its original value during this time. The change in charging current is therefore too great. Thus the control overshoots its mark. The result of this over-correction is that the generator voltage oscillates about an average value with a frequency corresponding to the transit time of the charging belt from ground to the high voltage terminal of the generator.

In order therefore to dampen the oscillation in the voltage, the filtered direct-current signal from the rectifier circuit passes through such resistor-condenser network which effectively reduces the amplified signal at the frequency at which the generator voltage oscillates, thereby lessening the overshooting of the correcting action of the stabilizer. This constitutes such anti-hunt circuit 14 that prevents momentary overloading of the charging belt 5 of the generator, and thereby minimizes electrical damage to such belts.

Next the signal from such anti-hunt circuit is compared to a standardized voltage signal from a regulated power supply. Such standardized signal herein referred to is a current, held constant by a regulated power supply, which yields a voltage depending upon the value of the resistor through which it passes. This voltage is opposite in polarity to the filtered signal from the alternating current amplifier 12 referred to. Since the standardized signal remains constant according to the adjustment of the resistor and the latter varies with the generator voltage, only that portion of the current which represents the variation in the generator voltage passes to the direct current amplifier 15. The standardized signal (or compensating or "bucking" voltage, as it may be termed) removes all but the error of variation in the input signal. This error of variation or voltage error we shall herein, for the purpose of standardization of nomenclature, term the compensating voltage.

The magnitude of such standardized voltage signal is controllable so that compensation at any value of the generator voltage can be obtained. Since the greatest portion of the signal from the generating voltmeter 10 is removed by the said standardized voltage signal only the change in input signal remains, and this we term, as stated, the compensating voltage.

The error voltage resulting from the approximate cancellation of the signal from the generating voltmeter 10, which we herein term the compensating voltage, is amplified by the single-tube direct-current amplifier 15, in order to increase its magnitude sufficiently so as to control the grid of the tube which valves the charging current.

Any suitable type of power supply may be employed to spray the charge onto the insulating traveling belt 5. The regulated power supply which provides a standarized voltage signal with which the signal from the anti-hunt circuit 14 is compared, to obtain the error voltage, is indicated merely diagrammatically at 16 in Figs. 1 and 2.

The high voltage power supply employed to spray the charge onto the charge-carrier belt 5 is indicated at 17. This is desirably a transformer-rectifier type of power supply. In the case of the electrostatic generator operating positively, as indicated in Fig. 2, we provide a resistance path to ground, indicated at 18. We provide the resistance path to ground for the purpose of drawing a nominal current from the power supply. Since the control tube acts as a stabilizing means only when it valves a current, the resistor 18 permits a known current to flow. The connection to the pulley 6 is at the high voltage end of the resistor. Hence the pulley potential depends on the effective potential of this point. If the tube restricts the current flowing through the resistor, the potential of the pulley is reduced, thereby ultimately lessening the changing current and ultimately the generator voltage.

When the control tube circuit is employed for a positive generator, as in Fig. 2, the charging current spray points are connected directly to ground, as indicated at 19 in Fig. 2.

It will be understood that the invention is practiced with both negative generators and positive generators. We provide a control tube circuit indicated diagrammatically at 20 in both Figs. 1 and 2, electrically connected in the case of the negatively operating electrostatic generator, as in Fig. 1, with the regulated power supply 16 and with the corona spraying points 8, and in the case of the electrostatic generator operating positively as in Fig. 2, with the regulated power supply 16 and with the high voltage power supply 17. For the control tube circuit 20 a high voltage triode or equivalent tube is provided, it being placed in the charging current circuit. The action thereof has been already set forth in the preceding portion of this specification. The said tube is any vacuum tube having a plurality of elements, including a cathode, a plate and a controlling grid or screen. The additional requirement that it withstand high voltages is one of degree. The requirement is for any special tube made for the specific use of stabilizing electrostatic generator voltages.

When the control tube circuit 20 is employed for a positively acting electrostatic generator, the charging current spray points 8 are connected directly to ground and the said control tube 20 is inserted between the low voltage side of the power supply secondary winding (such power supply being indicated at 17) and the regulated power supply 16 of the stabilizer.

For the control tube circuit 20 for a negative generator, a high voltage triode or equivalent tube is placed in the charging current circuit, as hereinafter specifically referred to. The lower pulley 6 of the charging belt system of the generator is raised in potential with respect to ground by means of a high-voltage transformer-rectifier power supply such as 17.

The error voltage signal from the stabilizer circuit 11 regulates the potential between the control grid and the cathode of the triode or equivalent. If the control grid is biased so that the said tube is conducting, there is very little potential difference between the cathode and the plate of the triode or equivalent, and charging current flows to the belt 5 in an unrestricted fashion. If, however, the grid thereof is biased so that no (or very little) current can pass through the said tube, the plate rises in potential because of its proximity (through the charging current spray points) to the potential of the high voltage transformer-rectifier power supply 15, thereby reducing the amount of charging current flowing to the charging belt 5. The said tube acts like a fine control on the potential of the high voltage power supply 17.

When the control tube circuit 20 is employed for a positive generator, the charging current spray points 8 are connected directly to ground, and the control tube is inserted between the low-voltage side of the power supply secondary winding and the regulated power supply of the stabilizer. Otherwise, the function and control of the stabilizer are the same as in the case of negative generator operation.

For a detailed explanation of the principles of operation of the electrostatic belt-type generator, as they apply with the voltage stabilizer, herein disclosed, we make reference to a paper printed in Reports on Progress in Physics,' vol. XI, 1948, page 1, entitled Electrostatic Generators for the Acceleration of Charged Particles by R. J. Van de Graaff, J. G. Trump and W. W. Buechner, of Massachusetts Institute of Technology.

To provide the necessary direct current plate voltages for the amplifier tube, the grid bias for the high voltage control tube and the standardized voltage signal employed in the practice of our invention, a simple regulated power supply as indicated at 16 is incorporated in the stabilizer circuit. A time-delay relay is included so that the generator circuits cannot be energized until the various tubes have reached thermal equilibrium.

With respect to coarse voltage control and load compensator, we point out that the magnitude of the standard voltage signal must be adjusted for each voltage and charging current level of the electrostatic belt-type generator. In order to control the standardized voltage signal, a potentiometer is inserted in series with the output of the regulated power supply 16.

For fine voltage control, a second potentiometer is also inserted in series with the output of the regulated power supply 16 for making very careful adjustments of the voltage desired.

With respect to gain control, we point out that in the alternating current amplifier section of the stabilizer circuit 11, there is employed a potentiometer control which regulates the magnitude of the average signal from the generating voltmeter 10. Under normal conditions of operation of the stabilizer, this control need not be adjusted after it has been originally set. For very low voltages, however, it is desirable to vary this control.

We find that between thirty seconds and one minute is needed to allow the various tubes of the stabilizer circuit 11 to reach thermal equilibrium, and we have found that the generator should not be operated before this time because erratic performance will develop.

The generator is initially started with the voltage controls set to their maximum values, that is, so that there is effectively no control of the grid of the high voltage tube. The generator voltage and current can then be manually set, without any influence by reason of the stabilizer circuit.

With the generator voltage at the value desired, the gain control of the stabilizer is set at some median value desired, such as one-third of the total control. The coarse voltage control of the stabilizer is gradually advanced. As the voltage tends to drop off, the adjustable input transformer of the generator transformer-rectifier set is advanced to compensate for the drop. The reason for this sag of voltage is that part of the output voltage of the transformer-rectifier set is being absorbed by the control tube of the stabilizer. The voltage control of the stabilizer is advanced until the generator voltage oscillates or "hunts." The most effective stabilizing action is obtained just below this point.

If the electrical load of the generator is changed appreciably (for example, if the accelerating tube current is raised or lowered), we find that the voltage control (coarse control is used only for very large changes) may have to be adjusted. For best performance under these changing conditions, the gain control may also have to be adjusted. Under ordinary conditions of operation, however, the generator voltage remains stable over extended periods of time. If the generator is to be shut down temporarily, no special precaution is necessary. When the generator is again started, the stabilizer will reproduce the voltage at which it was set before the shutdown. We find that the stabilizer power should never be turned off until after the terminal voltage of the generator is reduced from its operating range. We find that failure to do this results in a momentary erratic generator performance which may damage the charging belt electrically.

The stabilizer circuit of our invention may be used on various types of electrostatic belt-type generators with large or small generator voltage.

The generating voltmeter consists essentially of an insulated stator member (generally indicated at 10 in Figs. 1 and 2) mounted in the ground plane facing the high voltage terminal 1, from which it is periodically shielded by the rotation at constant speed of a grounded sectored disk shown in Fig. 5, and which will be more fully referred to. Briefly stated, the said generating voltmeter 10 consists of a grounded rotor member mounted in the ground plane facing the high voltage terminal 1, which periodically shields, by rotating at a constant speed, a set of insulated sectors, shown in Fig. 5. The stator-to-terminal capacitance is thus caused to vary periodically, and the induced stator current, which is a measure of the terminal voltage, passes through a special rectifier circuit indicated at 21 in Figs. 1 and 2, and is read on a direct current microammeter indicated at 22 in Figs. 1 and 2, which is connected to ground at 23. As subsequently stated, the part of the voltage induced on the isolated sector of the generating voltmeter is lead to the amplifier 12. In both Figs. 1 and 2 the insulated stator of the generating voltmeter 10 is diagrammatically indicated generally at 24 and the isolated sector thereof is indicated at 25. In both Figs. 1 and 2 the generating voltmeter circuit is shown diagrammatically. Therefore instead of showing two leads from two sets of stator-sectors to two rectifiers, the drawings are simplified by consolidating such duplicate elements, so as to show one lead from one set of stator-sectors to one rectifier.

A simplified circuit for the generating voltmeter 10 is shown in Fig. 5a. Therein V is the constant potential to be measured; $C_t$ is the periodically varying capacitance between the high voltage terminal and the stationary stator, the maximum variation of which is $C_v$; $C_g$ is the capacitance between stator and ground, which consists of a fixed and a periodically varying component. $C_s$ is the capacitance of the stator to ground when $C_t$ is maximum, which is kept as small as possible. $f$ is the frequency of $C_t$ in cycles per second. The period of $C_t$ is long compared to the relaxation time of the circuit. E is the back electromotive force of a single dry cell which prevents the flow of thermionic current through the rectifier circuit in the non-conducting part of the cycle. In said Fig. 5a the lead marked S corresponds to the two leads marked "To rectifier circuit of generating voltmeter" in Fig. 5, and the lead marked R in Fig. 5a is the connection of the rotor to ground.

The cycle of operation is as follows: As $C_t$ increases from its minimum value, the stator is charged through the rectifier $T_1$ by the influence of the potential V until $C_t$ reaches its maximum value. Then as $C_t$ decreases, the stator discharges through the rectifier $T_2$ and the meter until $C_t$ again reaches its minimum value, whereupon the cycle is repeated. It is evident that the meter reading is independent of the polarity of V. The current indicated by the meter is $$I = f(C_v V - C_s E)$$

assuming negligible rectifier drops. This relation shows that the current through the meter is proportional to the frequency of $C_t$ and for constant frequency consists of a term proportional to the potential V minus a constant term.

Again, referring to Fig. 5, the rotor is shown by broken lines, and the insulated stator of the generating voltmeter 10 is diagrammatically indicated generally at 24 and the isolated sector thereof is indicated at 25 as stated that part of the voltage induced on the isolated sector 25 is lead to amplifier 12. The circuit for the generating voltmeter 10 and the action of which has just been described is indicated generally at 26 in Fig. 5a.

Fig. 5a shows a simplified circuit wherein there is one set of stator-sectors, the sectors being electrically connected to each other and to the rectifier circuit. Fig. 5 shows two sets of stator-sectors, the sectors of one set being electrically connected to each other and to another rectifier circuit.

Since the inducted stator current is proportional to the frequency, it is desirable to divide the stator member into several poles so as to increase the magnitude of the induced currents for a fixed speed of the rotor. It may be noted that as the stator and rotor members are sector-shaped, the capacitance variation and hence the induced stator current will be an essentially rectangular wave of 180 electrical degrees duration. Consequently, by providing two sets of stators displaced 180 electrical degrees and provided with independent rectifier systems as shown in Fig. 6, a substantially constant rectified current flows in the microammeter circuit and at the same time the current output is doubled.

Comparing Fig. 5 with Fig. 6, it is to be noted that Fig. 6 shows the generating voltmeter circuit without the stabilizer as does Fig. 5a. In both Fig. 5a and Fig. 6 every sector of the stator is connected to the rectifier, but in Fig. 5, an isolated sector of the stator in connected to the stabilizer circuit, and is not connected to the rectifier. Consequently, four sectors of Fig. 5 correspond to the "stator #1" in Fig. 6, but only three of the remaining four sectors correspond to the "stator #2" in Fig. 6. The fourth sector, as stated, is connected to the stabilizer circuit.

Figure 3:
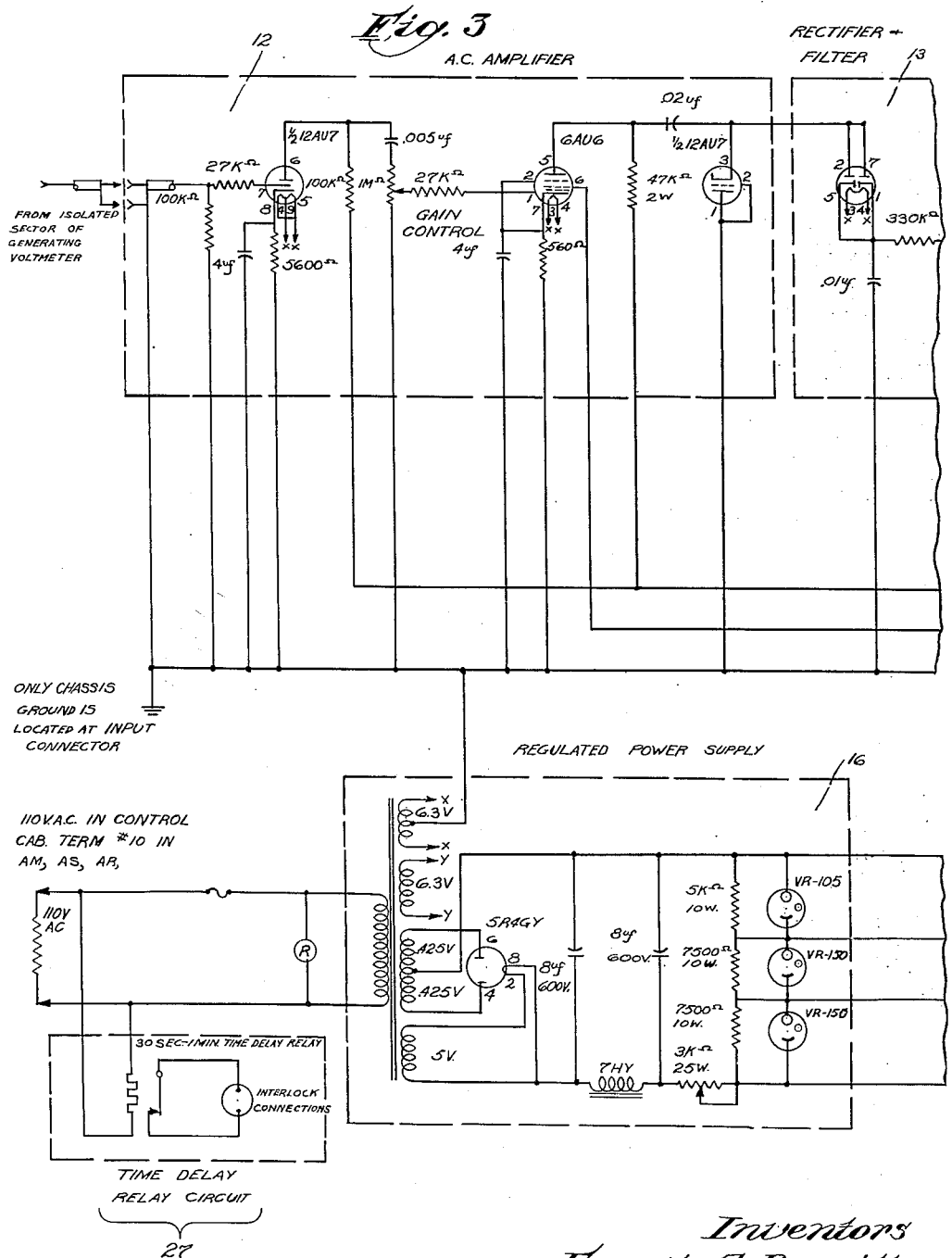
Fig. 3 is a schematic representation of a part (herein the left hand part as shown) of the stabilizer circuit actualy employed by us in the practice of our invention.

In Figs. 4 and 4a taken together, is shown in its entirety the electronic circuit which obtains a signal from the voltage measuring equipment of the electrostatic generator, and by means of which the fluctuation of the signal (as compared with a standardized signal) regulates the amount of electric current conveyed to the high voltage terminal 1 of the generator by the insulating conveyor belt 5 of Figs. 1, 2 and 3.

The legends upon Fig. 4 clearly indicate the parts and the functions thereof and render a detailed reference to each part unnecessary.

In said Fig. 4, the said alternating current amplifier 12 contains a control for regulating the amount of amplification. It contains a suitable vacuum tube which permits discharging of the condenser in the output stage of the said amplifier. The rectifier and filter 13 shown partly in Fig. 4 and partly in Fig. 4a contains a resistor - condenser network. The anti - hunt circuit 14 contains a resistor-condenser network. The direct current amplifier 15 shown in Fig. 4a is a single-tube direct-current amplifier. The control tube circuit shown in Fig. 4a is indicated at 20. It contains a high voltage triode or equivalent tube, the necessary characteristics of which have been already set forth in a closely preceding portion of the specification.

As previously stated, the lower pulley 6 of the charging belt 5 of the generator is raised in potential with respect to ground by means of the high-voltage transformer-rectifier power supply, which is indicated at 17 in both Figs. 2 and 3. The error voltage signal from the entire electronic circuit, which is generally indicated at 11 in Figs. 2 and 3, regulates the potential between the control grid and the cathode of the triode or equivalent tube. If, when the generator is operating negatively, as in Fig. 1, the control grid of the said tube at 20 is biased so that the tube is conducting, there is very little potential difference between the cathode and the plate of the triode or equivalent tube. However, if the grid of the said tube is biased so that no, or very little, current can pass through the said tube, the plate rises in potential. The said triode or equivalent tube acts as a fine control on the potential of the high-voltage power supply. In case the generator is acting positively, as in Fig. 2, the triode or equivalent tube, indicated at 20, is inserted between the low-voltage side of the power-supply secondary winding and the regulated power supply 16 of the stabilizer.

In order to provide the necessary direct-current plate voltage for the amplifier tubes, the grid and the screen biases for the high-voltage control-tube triode or its equivalent, and the standardized voltage signal, a regulated power supply is provided in the stabilizer circuit, and this is indicated at 16 in Figs. 2, 3 and 4.

Also, a time-delay relay, shown at 27 in Fig. 4, is provided in the electronic circuit, in co-relation with the regulated power supply 16, so that the generator circuits cannot be energized until the various tubes have reached thermal equilibrium.

Regarding the high voltage power supply used in transferring electric charges to the belt 5, and the regulated power supply used in the stabilizer circuit, we desire it to be understood that in our employment of the term "charge-transferring means to transfer charges onto the belt" in the specification and in the claims, we do not thereby include merely frictional methods or devices, as they are not at present dependable for our purpose. The term "regulated power supply" does not pertain to the charging-belt power-supply, but to the power supply to the stabilizer circuit. Said latter power supply is electrically stabilized against input voltage fluctuations. The charging-belt power-supply is in fact and in practice a regulatable power supply.

Having thus described an electronic circuit obtaining a signal from the voltage-measuring equipment of an electrostatic belt-type generator, which, by means of the fluctuation of the signal as compared with a standardized signal, regulates the amount of electric current conveyed to the high voltage terminal of the generator by means of its insulating belt, thereby causing the terminal voltage to be stabilized, we desire it to be understood that although specific terms are employed, they are used in a generic and descriptive sense and not for purpose of limitation, the scope of the invention being set forth in the following claims.

We claim:

1. Apparatus for stabilizing the voltage of an electrostatic belt-type generator comprising in combination, an electrostatic belt-type generator having charge spraying points; a generating voltmeter electrically associated with the high voltage terminal of said generator; and wherein an alternating current is induced that is proportional to the generator voltage; a stabilizer circuit electrically associated with the spraying points of the said generator the said generating voltmeter having a series of sections whereof at least one may be isolated in order that a small portion of the current of said generating voltmeter may be thereby isolated for use as a signal to the said stabilized circuit, which circuit is electrically connected to such isolated section of said generating voltmeter; and means in said stabilizer circuit for employing the current from the said isolated section of said generating voltmeter as a signal to the said stabilizer circuit, so that by reason of the fluctuation of such signal as compared with a standardized voltage signal from a regulated power supply, regulation is effected by the amount of charging current from a high voltage power supply, that is sprayed over the belt of the said generator, thereby causing the terminal voltage to be stabilized.

2. Apparatus for stabilizing the voltage of an electrostatic belt-type generator comprising in combination: an electrostatic belt-type generator having a generating voltmeter electrically associated with the high voltage terminal thereof; a stabilizer circuit electrically associated with the spraying points of said generator; the said generating voltmeter having a series of sections whereof at least one may be isolated in order that a small portion of the current of said generating voltmeter may be thereby isolated for use as a signal to the said stabilized circuit, which circuit is electrically connected to such isolated section of said generating voltmeter and means in said stabilizer circuit for employing the current from the isolated portion of said generating voltmeter as a signal to the said stabilizer circuit, so that by reason of the fluctuation of such signal as compared with a standardized voltage signal from a regulated power supply, regulation is effected by the amount of charging current from a high voltage power supply, that is sprayed over the belt of the said generator, thereby causing the terminal voltage to be stabilized.

3. Apparatus for stabilizing the voltage of an electrostatic belt-type generator comprising in combination; an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

4. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

5. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify the said amplified signal; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

6. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; controlling means for regulating the amount of amplification, thereby permitting the remainder of the current of the stabilizer circuit to operate in its most effective range; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

7. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; controlling means for regulating the amount of amplification, thereby permitting the remainder of the current of the stabilizer circuit to operate in its most effective range, there being a vacuum tube in said stabilizer circuit to permit the discharging of the condenser in the output stage of the amplifier so as to dissipate the remainder of the alternating current signal; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

8. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify and to filter the said amplified signal, said rectifying means constituting whole-wave rectification of said signal; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

9. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify the said amplified signal; a resistor-condenser network to average the rectified signal from the amplifying means, thereby lessening the suddenness of any correcting action of the stabilizer current, and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

10. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify the said amplified signal; an anti-hunt circuit in the stabilizer circuit to prevent momentary overloading of the charging belt of the generator, thereby minimizing electrical damage to such belt; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

11. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify the said amplified signal; an anti-hunt circuit in the stabilizer circuit to prevent momentary overloading of the charging belt to the generator, thereby minimizing electrical damage to such belt; a regulated power supply, a high voltage triode tube in circuit with said regulated power supply and also electrically associated with said stabilizer circuit and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

12. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify the said amplified signal; an anti-hunt circuit in the stabilizer circuit to prevent momentary overloading of the charging belt of the generator, thereby minimizing electrical damage to such belt; a regulated power supply; means whereby the signal from the said anti-hunt circuit is compared to a standardized voltage signal from such regulated power supply, there being at least one potentiometer in series with the signal from the regulated power supply; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

13. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; a potentiometer control to regulate the magnitude of the average signal from the generating voltmeter; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

14. Apparatus for stabilizing the voltage of an electrostatic belt-type generator comprising in combination: an electrostatic belt-type generator having charge transferring means to transfer charges onto said belt and having a high voltage terminal to receive such charges from said belt; a generating voltmeter wherein an alternating current is induced that is proportional to the generator voltage; means to isolate one portion of said generating voltmeter from the rest thereof so that the current for such isolated portion may be used as a signal and so that the remainder of the circuit from the generating voltmeter may be used to observe the generator voltage; a stabilizer circuit wherein such signal exists as an alternating current; means to amplify in said stabilizer circuit the alternating current constituting said signal; means to rectify the said amplified signal, an anti-hunt circuit in the stabilizer circuit to prevent momentary overloading of the charging belt of the generator, thereby minimizing electrical damage to such belt; a regulated power supply; a high voltage triode tube in circuit with said regulated power supply and a regulated power supply in the stabilizer circuit, said triode tube being also in circuit with said stabilizer circuit; a time-delay relay to prevent the generator circuits from being energized until the vacuum tubes in such circuits have reached thermal equilibrium; and means whereby the fluctuation of such signal obtained from the isolated portion of said generating voltmeter as compared with a standardized voltage signal from a regulated power supply, controls the amount of charging current that is transferred by said charge transferring means onto said belt, thereby stabilizing the terminal voltage of the said electrostatic belt-type generator.

15. Apparatus for stabilizing the voltage of an electrostatic belt-type generator comprising in combination: an electrostatic belt-type generator having charge transferring means and a high voltage terminal to which the charges are conveyed by the belt of the generator; means to measure the voltage of said generator; an electronic circuit that receives a signal from said means to measure the voltage of the said electrostatic generator, and means whereby the fluctuation of such signal obtained from the said means to measure the voltage of the said electrostatic generator as compared with a standardized voltage signal from a regulated power supply, controls the amount of charging current that is transferred by the said charge transferring means and onto the belt of such electrostatic generator, thereby stabilizing the terminal voltage of the said electrostatic belt-type generator.

ERNEST A. BURRILL.
WILLIAM V. SMITH.

REFERENCES CITED

The following references are of record in the file of this patent:

UNITED STATES PATENTS

| Number | Name | Date |
| --- | --- | --- |
| 2,058,732 | Simon | Oct. 27, 1936 |
| 2,237,016 | Stratton | Apr. 1, 1941 |